United States Patent
Jørgensen et al.

(10) Patent No.: US 12,466,144 B2
(45) Date of Patent: Nov. 11, 2025

(54) PRECURED FIBROUS STRIP FOR A LOAD-CARRYING STRUCTURE FOR A WIND TURBINE BLADE

(71) Applicants: LM WIND POWER A/S, Kolding (DK); BLADE DYNAMICS LIMITED, Eastleigh (GB)

(72) Inventors: Jeppe Bjørn Jørgensen, Kolding (DK); Ole Nielsen, Kolding (DK); Rama Razeghi, Eastleigh (GB)

(73) Assignees: LM WIND POWER A/S, Kolding (DK); BLADE DYNAMICS LIMITED, Eastleigh (GB)

( * ) Notice: Subject to any disclaimer, the term of this patent is extended or adjusted under 35 U.S.C. 154(b) by 97 days.

(21) Appl. No.: 18/026,908

(22) PCT Filed: Oct. 5, 2021

(86) PCT No.: PCT/EP2021/077373
§ 371 (c)(1),
(2) Date: Mar. 17, 2023

(87) PCT Pub. No.: WO2022/073967
PCT Pub. Date: Apr. 14, 2022

(65) Prior Publication Data
US 2023/0330953 A1 Oct. 19, 2023

(30) Foreign Application Priority Data
Oct. 7, 2020 (GB) ........................ 2015876

(51) Int. Cl.
*B29C 70/86* (2006.01)
*B29C 70/20* (2006.01)
(Continued)

(52) U.S. Cl.
CPC ............ *B29C 70/86* (2013.01); *B29C 70/205* (2013.01); *B29C 70/48* (2013.01);
(Continued)

(58) Field of Classification Search
CPC ........ F03D 1/06; F03D 1/0675; F03D 1/0683; B29C 70/86; B29C 70/205; F05B 2240/302; B29K 2105/0881
See application file for complete search history.

(56) References Cited

U.S. PATENT DOCUMENTS 8,636,252 B2 * 1/2014 Pook ................... B29C 66/1122
244/119
2014/0301859 A1 * 10/2014 Hancock ............... B29C 70/443
156/60
(Continued)

FOREIGN PATENT DOCUMENTS

EP 3026259 A1 6/2016
EP 3424696 A1 1/2019
(Continued)

*Primary Examiner* — Nathaniel E Wiehe
*Assistant Examiner* — Maxime M Adjagbe
(74) *Attorney, Agent, or Firm* — Nath, Goldberg & Meyer; Tanya E. Harkins

(57) ABSTRACT

A precured fibrous composite strip for a load-carrying structure for a wind turbine blade has a first longitudinal end and a second longitudinal end, a first side and a second side with a width defined as the distance between the first side and the second side, and an upper surface and a lower surface with a thickness defined as the distance between the upper surface and the lower surface. The strip includes a taper region with a taper length at the first longitudinal end. The taper region tapers in thickness towards the first longitudinal end. The taper region includes a first taper section proximal to the first longitudinal end and having a first average taper angle, a third taper section distal to the first
(Continued)

longitudinal end and having a third average taper angle, and a second taper section between the first taper section and the third taper section.

20 Claims, 6 Drawing Sheets

(51) Int. Cl.
    *B29C 70/48*     (2006.01)
    *F01D 1/06*     (2006.01)
    *B29K 105/08*     (2006.01)
    *B29K 307/04*     (2006.01)
    *B29K 309/08*     (2006.01)
    *B29L 31/08*     (2006.01)
    *F01D 5/28*     (2006.01)

(52) U.S. Cl.
    CPC .. *B29K 2105/0881* (2013.01); *B29K 2307/04* (2013.01); *B29K 2309/08* (2013.01); *B29L 2031/085* (2013.01); *F01D 5/282* (2013.01)

(56) References Cited

U.S. PATENT DOCUMENTS

| | | | |
|---|---|---|---|
| 2016/0146185 A1* | 5/2016 | Yarbrough | B32B 5/22 156/242 |
| 2016/0263775 A1* | 9/2016 | Boon | F03D 1/0675 |
| 2016/0273516 A1* | 9/2016 | Smith | B29C 70/521 |
| 2017/0218918 A1* | 8/2017 | Cieslak | B32B 5/12 |
| 2018/0156202 A1* | 6/2018 | Lipka | F03D 80/30 |

FOREIGN PATENT DOCUMENTS

| | | |
|---|---|---|
| EP | 3549752 A1 | 10/2019 |
| EP | 3550138 A1 | 10/2019 |
| GB | 2497578 A | 6/2013 |
| WO | 2006015598 A1 | 2/2006 |
| WO | 2015070876 A1 | 5/2015 |
| WO | 2020103990 A1 | 5/2020 |

* cited by examiner

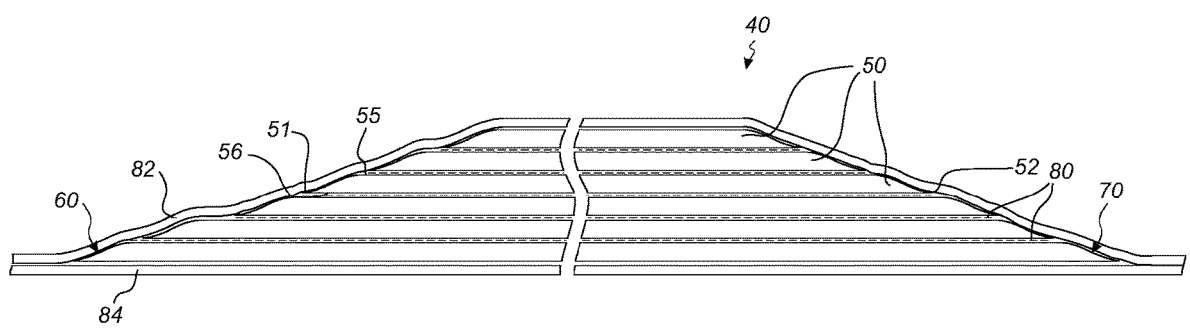
Fig. 4
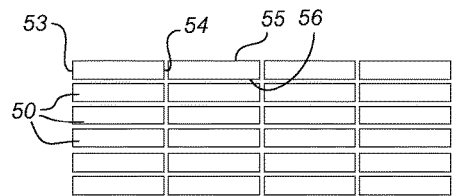 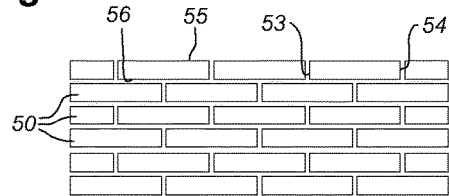
Fig. 5a        Fig. 5b

PRECURED FIBROUS STRIP FOR A LOAD-CARRYING STRUCTURE FOR A WIND TURBINE BLADE

This is a National Phase Application filed under 35 U.S.C. 371 as a national stage of PCT/EP2021/077373, filed Oct. 5, 2021, an application claiming the benefit of Great Britain Application No. 2015876.2, filed Oct. 7, 2020, the content of each of which is hereby incorporated by reference in its entirety.

FIELD OF THE INVENTION

The present invention relates to a precured fibrous strip for a load-carrying structure, such as a spar cap for a wind turbine blade, a spar cap comprising such a fibrous strip, a method of manufacturing a spar cap for a wind turbine blade, and a wind turbine blade comprising a spar cap comprising such a fibrous strip or manufactured according to said method.

BACKGROUND OF THE INVENTION

Wind turbine blades are often manufactured according to one of two constructional designs, namely a design where a thin aerodynamic shell is glued onto a spar beam, or a design where spar caps, also called main laminates, are integrated into the aerodynamic shell.

In the first design, the spar beam constitutes the load-bearing structure of the blade. The spar beam as well as the aerodynamic shell or shell parts are manufactured separately. The aerodynamic shell is often manufactured as two shell parts, typically as a pressure side shell part and a suction side shell part. The two shell parts are glued or otherwise connected to the spar beam and are further glued to each other along a leading edge and a trailing edge of the shell parts. This design has the advantage that the critical load-carrying structure may be manufactured separately and therefore easier to control. Further, this design allows for various different manufacturing methods for producing the beam, such as moulding and filament winding.

In the second design, the spar caps or main laminates are integrated into the shell and are moulded together with the aerodynamic shell. The main laminates typically comprise a high number of fibre layers compared to the remainder of the blade and may form a local thickening of the wind turbine shell, at least with respect to the number of fibre layers. Thus, the main laminate may form a fibre insertion in the blade. In this design, the main laminates constitute the load-carrying structure. The blade shells are typically designed with a first main laminate integrated in the pressure side shell part and a second main laminate integrated in the suction side shell part. The first main laminate and the second main laminate are typically connected via one or more shear webs, which for instance may be C-shaped or I-shaped. For very long blades, the blade shells further along at least a part of the longitudinal extent comprise an additional first main laminate in the pressure side shell, and an additional second main laminate in the suction side shell. These additional main laminates may also be connected via one or more shear webs. This design has the advantage that it is easier to control the aerodynamic shape of the blade via the moulding of the blade shell part.

Vacuum infusion or VARTM (vacuum assisted resin transfer moulding) is one method, which is typically employed for manufacturing composite structures, such as wind turbine blades comprising a fibre-reinforced matrix material.

During the process of filling the mould, a vacuum, said vacuum in this connection being understood as an underpressure or negative pressure, is generated via vacuum outlets in the mould cavity, whereby liquid polymer is drawn into the mould cavity via the inlet channels in order to fill said mould cavity. From the inlet channels, the polymer disperses in all directions in the mould cavity due to the negative pressure as a flow front moves towards the vacuum channels. Thus, it is important to position the inlet channels and vacuum channels optimally in order to obtain a complete filling of the mould cavity. Ensuring a complete distribution of the polymer in the entire mould cavity is, however, often difficult, and accordingly this often results in so-called dry spots, i.e. areas with fibre material not being sufficiently impregnated with resin. Thus, dry spots are areas where the fibre material is not impregnated, and where there can be air pockets, which are difficult or impossible to remove by controlling the vacuum pressure and a possible overpressure at the inlet side. In vacuum infusion techniques employing a rigid mould part and a resilient mould part in the form of a vacuum bag, the dry spots can be repaired after the process of filling the mould by puncturing the bag in the respective location and by drawing out air for example by means of a syringe needle. Liquid polymer can optionally be injected in the respective location, and this can for example be done by means of a syringe needle as well. This is a time-consuming and tiresome process. In the case of large mould parts, staff have to stand on the vacuum bag. This is not desirable, especially not when the polymer has not hardened, as it can result in deformations in the inserted fibre material and thus in a local weakening of the structure, which can cause for instance buckling effects.

In most cases, the polymer or resin applied is polyester, vinyl ester or epoxy, but may also be PUR or pDCPD, and the fibre reinforcement is most often based on glass fibres or carbon fibres or even hybrids thereof. Epoxies have advantages with respect to various properties, such as shrinkage during curing (which in some circumstances may lead to less wrinkles in the laminate), electrical properties and mechanical and fatigue strengths. Polyester and vinyl esters have the advantage that they provide better bonding properties to gelcoats. Thereby, a gelcoat may be applied to the outer surface of the shell during the manufacturing of the shell by applying a gelcoat to the mould before fibre-reinforcement material is arranged in the mould. Thus, various post-moulding operations, such as painting the blade, may be avoided. Further, polyesters and vinyl esters are cheaper than epoxies. Consequently, the manufacturing process may be simplified, and costs may be lowered.

Often the composite structures comprise a core material covered with a fibre reinforced material, such as one or more fibre reinforced polymer layers. The core material can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material.

Resin transfer moulding (RTM) is a manufacturing method, which is similar to VARTM. In RTM, the liquid resin is not drawn into the mould cavity due to a vacuum generated in the mould cavity. Instead, the liquid resin is forced into the mould cavity via an overpressure at the inlet side.

Prepreg moulding is a method in which reinforcement fibres are pre-impregnated with a precatalysed resin. The resin is typically solid or near-solid at room temperature. The prepregs are arranged by hand or machine onto a mould surface, vacuum bagged and then heated to a temperature, where the resin is allowed to reflow and eventually cured. This method has the main advantage that the resin content in the fibre material is accurately set beforehand. The prepregs are easy and clean to work with and make automation and labour saving feasible. The disadvantage with prepregs is that the material cost is higher than for non-impregnated fibres. Further, the core material needs to be made of a material which is able to withstand the process temperatures needed for bringing the resin to reflow. Prepreg moulding may be used both in connection with an RTM and a VARTM process.

Further, it is possible to manufacture hollow mouldings in one piece by use of outer mould parts and a mould core. Such a method is for instance described in EP 1 310 351 and may readily be combined with RTM, VARTM and prepreg moulding.

As for instance blades for wind turbines have become longer and larger in the course of time and may now be more than 100 meters long, the impregnation time in connection with manufacturing such blades has increased, because more fibre material has to be impregnated with polymer. Furthermore, the infusion process has become more complicated, as the impregnation of large shell members, such as blades, requires control of the flow fronts to avoid dry spots, said control may e.g. include a time-related control of inlet channels and vacuum channels. This increases the time required for drawing in or injecting polymer. As a result, the polymer has to stay liquid for a longer time, normally also resulting in an increase in the curing time.

Further, as the blades are becoming longer, it has become increasingly customary to manufacture blades from pre-manufactured parts. In particular, the spar cap of the structure may be manufactured as precured parts, such as pultruded elements. This improves the alignment of fibres for the spar cap and prevents wrinkles in the layup. Further, it improves the infusion time and decreases the time for in-mould preparation of the wind turbine blade. The precured parts may for instance be pultruded fibre-reinforced planks and may be stacked, e.g. in an array.

The spar cap typically has a varying thickness along the span of the spar cap, e.g. having a tapered thickness towards the root end of the blade and/or the tip end of the blade. In order to accommodate the varying thickness, an end region of the precured elements may be tapered. This provides a gradual stiffness transition.

However, even with the taper sections at the ends of the precured elements, resin rich areas may still be formed at the taper sections. Further, if fibre layers are draped on top of the stacked precured parts, wrinkles may be formed at the tapered end regions. In addition, the tip of the tapered end regions is prone to breaking or cracking.

SUMMARY OF THE INVENTION

It is an object of the invention to obtain a new precured fibrous strip, a new spar cap, a new method of manufacturing a spar cap for a wind turbine blade, and a new wind turbine blade, which overcome or ameliorate at least one of the disadvantages of the prior art or which provide a useful alternative.

According to a first aspect, this is obtained by a precured fibrous composite strip for a load-carrying structure, such as a spar cap, for a wind turbine blade, wherein the strip has a first longitudinal end and a second longitudinal end; a first side and a second side with a width defined as the distance between the first side and the second side; and an upper surface and a lower surface with a thickness defined as the distance between the upper surface and the lower surface; and wherein the strip comprises a taper region with a taper length at the first longitudinal end, wherein the taper region tapers in thickness towards the first longitudinal end and comprises: a first taper section proximal to the first longitudinal end and having a first average taper angle; a third taper section distal to the first longitudinal end and having a third average taper angle; and a second taper section between the first taper section and the third taper section and having a second average taper angle, wherein the second average taper angle is larger than both the first average taper angle and the third average taper angle.

Accordingly, it is seen that the precured fibrous composite strip comprises a section with a shallow taper angle near the start of the taper region, a middle region with a larger taper angle, and a section with a shallow taper angle near the longitudinal end of the strip. Thereby, a smooth transition is obtained in the longitudinal direction, which is particular advantageous, when stacking such strips on top of each other in a load-carrying structure or where a fibre material is arranged over the strips.

The smooth transition lowers the formation of resin rich area and the formation of wrinkles in the fibre material that is draped over the strips.

It is clear that the strip may also comprise a similar taper region at the second longitudinal end. Further, the strip may also comprise a similar taper region at the first side and/or at the second side.

According to a second aspect, the object is obtained by a spar cap for a wind turbine blade comprising a precured fibrous strip according to the first aspect.

According to a third aspect, the object is obtained by a wind turbine blade comprising a spar cap according to the second aspect.

According to a fourth aspect, the object is obtained by a method of manufacturing a spar cap for a wind turbine blade, the method comprising: providing a plurality of precured fibrous strips including at least one precured fibrous strip according to the first aspect, stacking the plurality of precured fibrous strips such that interface regions are formed between adjacent precured fibrous strips, supplying resin to the plurality of precured fibrous strips and causing the resin to fill the interface regions between adjacent strips, and curing the resin in order to form the spar cap.

Finally, the object is obtained by a spar cap manufactured according to the above method and a wind turbine blade comprising such a spar cap.

In the following, preferred embodiments according to the above aspects are described. The various embodiments may be combined in any conceived combination.

According to a preferred embodiment, the taper section has a blunt face at the first longitudinal end, wherein the blunt face has an end step thickness. By leaving the end face slightly blunt, the end of the precured fibrous strip is even less likely to break off or form cracks. The end step thickness may be between 0.01 mm and 0.3 mm, preferably between 0.05 mm and 0.2 mm, e.g. around 0.1 mm.

According to another preferred embodiment, the taper region has a substantially S-shaped profile in the longitudinal direction of the strip. An S-shaped profile is particularly advantageous for obtaining the smooth transition with the three mentioned taper regions and for reducing the likelihood of cracks forming.

According to an advantageous embodiment, the taper region comprises: a first curvature region proximal to the first longitudinal end and having an outer radius of curvature, wherein the first curvature region has an intersection length, and a second curvature region distal to the first longitudinal end and having an inner radius of curvature. This provides a particular simple way of providing a substantially S-shaped profile.

According to another advantageous embodiment:
the thickness of the strip is defined as $t_{plank}$,
the taper length is defined as $L_{chamfer}$,
the outer radius of curvature is defined as $R_1$,
the inner radius of curvature is defined as $R_2$,
the end step thickness is defined as $t_{es}$,
the longitudinal direction is defined as z, and
the thickness direction is defined as y,
wherein the first curvature region approximately has a first profile defined by:

$$z=R_1 \cos(\theta_1) \text{ and } y=t_{es}-R_1(\sin(\theta_1)-1) \text{ for } \theta_1=[\pi/2; \theta_1^{IS}]; \text{ and}$$

wherein the second curvature region approximately has a second profile defined by:

$$z=L_{chamfer}-R_2 \cos(\theta_2) \text{ and } y=t_{plank}-R_2(1-\sin(\theta_2)) \text{ for } \theta_2=[\theta_2^{IS};\pi/2]$$

wherein
$\theta_1^{IS}$ is the value of variable $\theta_1$ at an intersection between the first curvature region and the second curvature region; and
$\theta_2^{IS}$ is the value of variable $\theta_2$ at the intersection between the first curvature region and the second curvature region.

This embodiment is particular simple for obtaining a substantially S-shaped profile with reduced likelihood of crack formation at the taper section. Further, it makes it possible to design the taper section by use of a dimensionless ratio between a distance to the intersection point, or intersection length ($L_{is}$), and the taper length. The intersection length is defined by the distance from the end of the strip to the point where the first curvature and the second curvature regions intersect.

In a preferred embodiment, a profile of the taper section deviates at most 5%, preferably at most 3%, and more preferably at most 2% from the first profile and the second profile. In other words, the profile has a tolerance of at most 5%, at most 3%, or at most 2% of the defined profile.

In another preferred embodiment, a ratio between the intersection length and the taper length is at least 0.4, preferably at least 0.5, preferably at least 0.6, more preferably at least 0.7, even more preferably at least 0.8 and even preferably at least 0.9. Higher values for the ratio have shown to be even more robust against crack formations. However, even at a value of 0.4, the profiles have shown to have huge improvements over profiles with a straight chamfer.

In yet another preferred embodiment, the taper region has a thickness to length ratio in the range 1:10 to 1:200, preferably in the range 1:20 to 1:150, and more preferably in the range 1:50 to 1:125, e.g. around 1:100.

In a preferred embodiment, the strip comprises unidirectionally oriented reinforcement fibres, such as glass fibres or carbon fibres, oriented in the longitudinal direction. The strip is preferably a pultruded element. However, the strip may also be premanufactured in other ways, such as by extrusion or moulding.

In another preferred embodiment, the thickness of the strip is between 1 mm and 10 mm, preferably between 3 mm and 8 mm, and more preferably between 4 and 7 mm, e.g. around 5 mm.

In another preferred embodiment, the width of the strip is between 30 mm and 300 mm, preferably between 50 mm and 200 mm, e.g. around 100 mm.

The length of the strip may advantageously be at least 100 mm and be up to the length of the part that it is used for, e.g. up to the length of a spar cap or wind turbine blade. The length may e.g. be up to 100 m. In the future, even longer strips may be used.

The plurality of precured fibrous strips are preferably stacked in an array. The strips may be stacked on top of each other so as to be aligned or mutually displaced in the transverse direction.

The above-mentioned method may comprise the step of arranging flow-promoting material between at least some of the stacked precured fibrous strips. This may promote flow between densely packed strips.

The method may also comprise the step of draping one or more fibre layers over the plurality of stacked precured fibrous strips before the step of supplying resin. The one or more fibre layers may form an inner skin, e.g. of the blade shell. Similarly, one or more fibre layers may be arranged outermost to form an outer skin, e.g. of the blade shell.

BRIEF DESCRIPTION OF THE FIGURES

The invention is explained in detail below with reference to embodiments shown in the drawings, in which
FIG. 4 shows a side view of a spar cap,
FIGS. 5a and 5b show embodiments for a cross-section of a spar cap.

DETAILED DESCRIPTION OF THE INVENTION

In the following, a number of exemplary embodiments are described in order to understand the invention.

Figure 1:
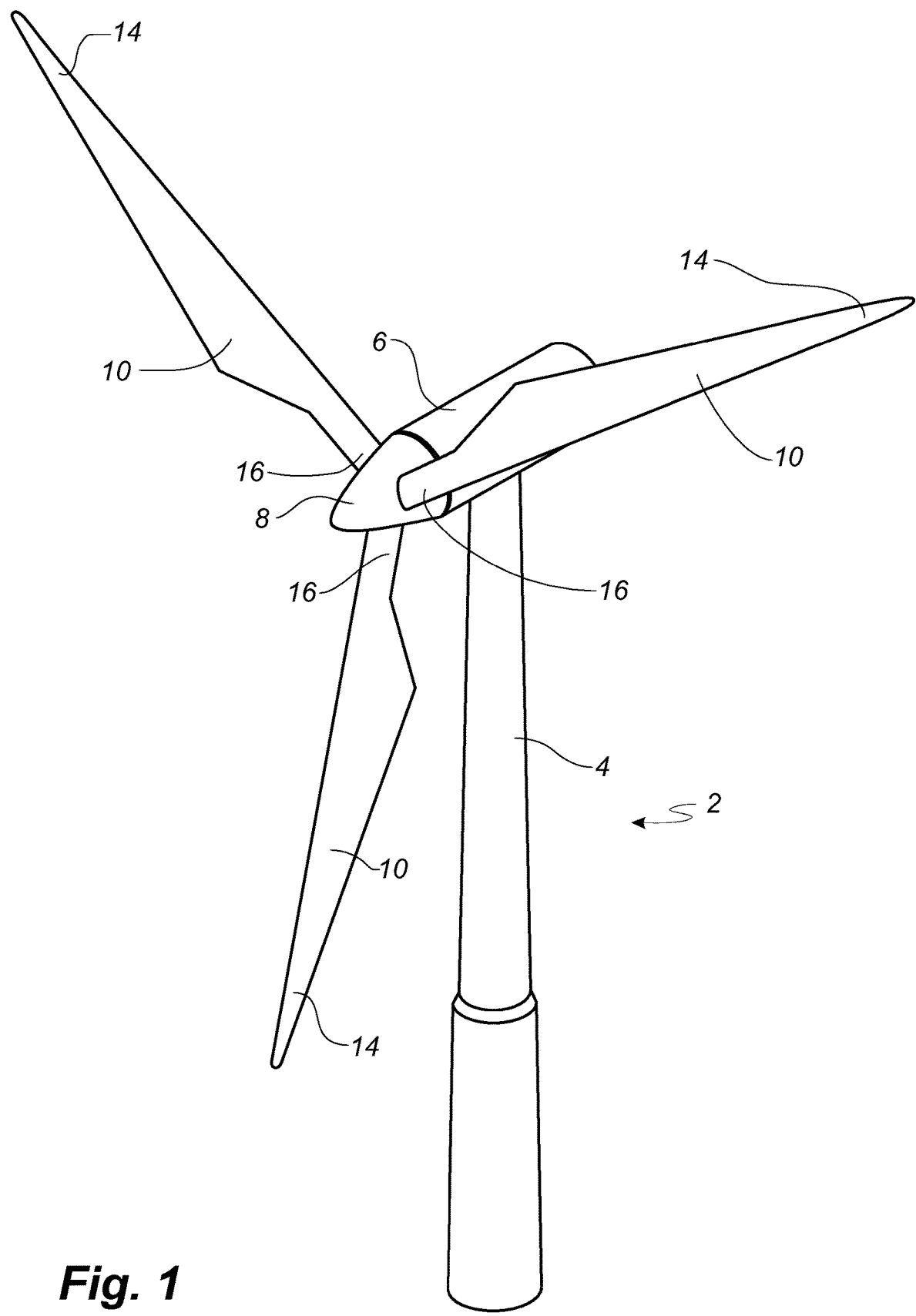
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
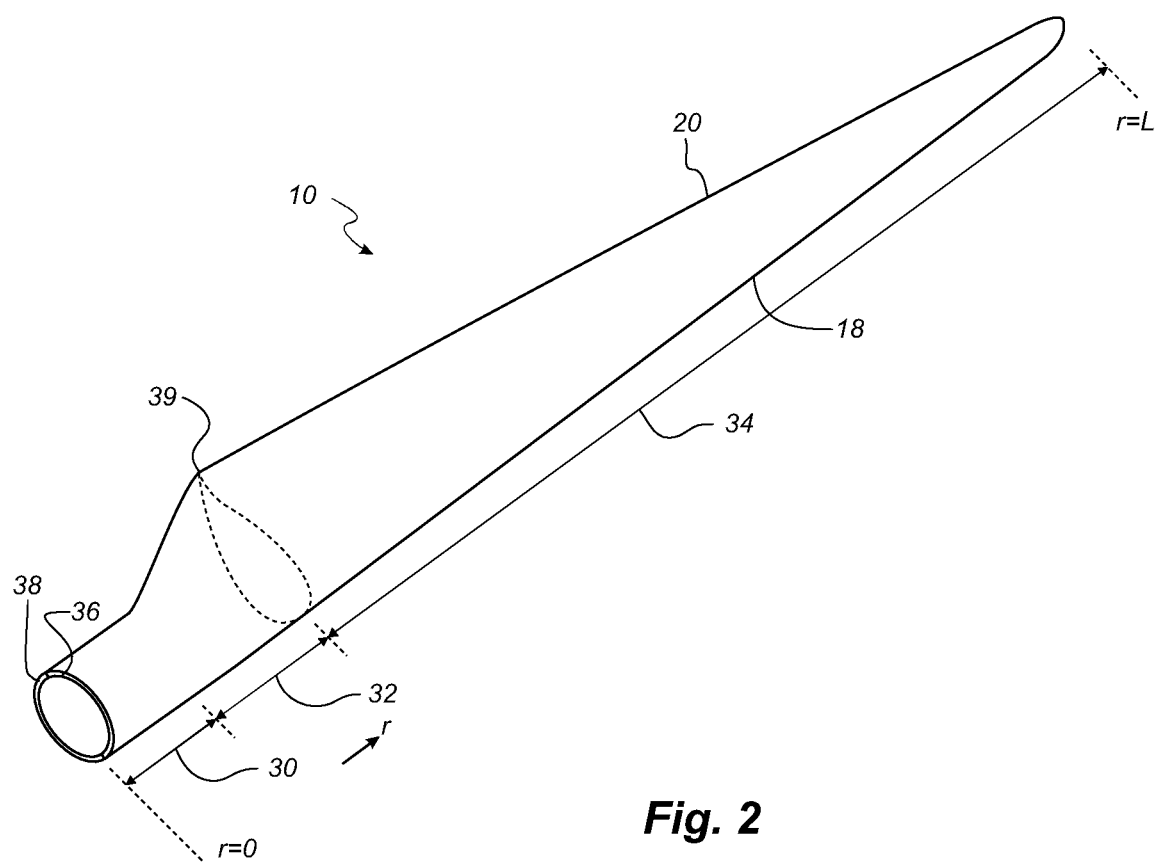
FIG. 2 shows a schematic view of a wind turbine blade.

FIG. 2 shows a schematic view of a first embodiment of a wind turbine blade 10 disclosure. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10 when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 39 of the blade 10 is defined as the position, where the blade 10 has its largest chord length. The shoulder 39 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge 20 of the blade.

In the following, the invention is explained with respect to the manufacture of the pressure side shell part 36 or suction side shell part 38.

Figure 3:
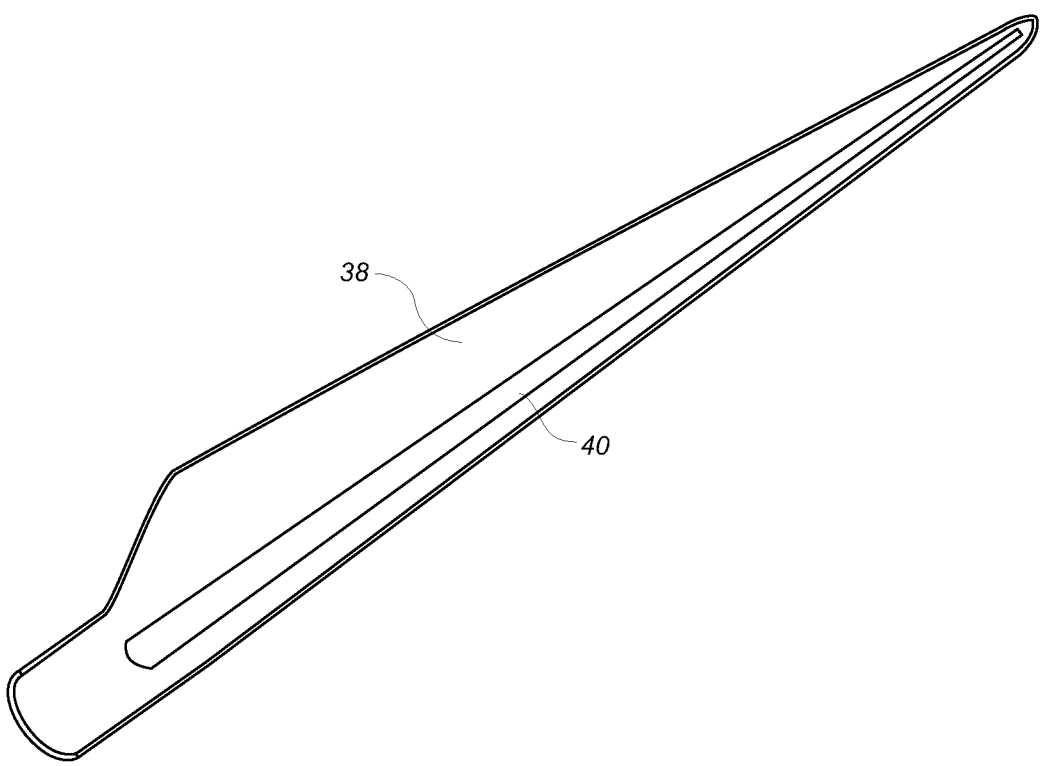
FIG. 3 shows a schematic view of a wind turbine blade shell.

FIG. 3 shows a perspective view of a blade shell part, here illustrated with the suction side shell part 38, which is provided with a load-carrying structure, which forms a spar cap 40 or main laminate. The spar cap 40 can be integrated into the blade shell or it can be a separate spar cap that is attached, e.g. by adhesion, to the blade shell 38. The spar cap 40 may be part of a separate spar structure. However, it is also possible to provide a blade with spar caps provided at both the pressure side shell part 36 and the suction side shell part 38, with one or more shear webs attached between the spar caps.

FIG. 4 shows a side view of a manufactured spar cap 40. The spar cap is made from a plurality of precured fibrous strips 50 that extends in the longitudinal direction of the spar cap 40. The precured fibrous strips 50 may be stacked on top of each other as shown in FIG. 4. In a cross-sectional view, the strips 50 may be stacked right on top of each other as shown in FIG. 5a, or they may be displaced between layers, e.g. as shown in FIG. 5b with partially overlapping strips.

The precured fibrous strips 50 preferably comprise unidirectionally oriented reinforcement fibres, such as glass fibres or carbon fibres, oriented in the longitudinal direction. Further, the strips are preferably pultruded elements.

The pultruded strips 50 each have a first longitudinal end 51 and a second longitudinal end 52, a first side 53 and a second side 54 with a width defined as the distance between the first side 53 and the second side 54, and an upper surface 55 with a thickness defined as the distance between the upper surface 55 and the lower surface 56. The upper surface 55 and lower surface 56 are defined in relation to how the pultruded strips are laid up, and the upper surface 55 will typically be arranged towards the inner surface of the spar cap 50, whereas the lower surface 56 will typically face towards the outer surface of the spar cap 50, as seen in relation to the blade shell 38. The strips each comprise a taper region 60 with a taper length at the first longitudinal end 51 and may further comprise a second taper region 70 at the second longitudinal end 52.

The taper region 60 advantageously has a thickness to length ratio in the range 1:10 to 1:200, preferably in the range 1:20 to 1:150, and more preferably in the range 1:50 to 1:125, e.g. around 1:100. The thickness of the strip 50 may advantageously be between 1 mm and 10 mm, preferably between 3 mm and 8 mm, and more preferably between 4 and 7 mm, e.g. around 5 mm. the width of the strip is between 30 mm and 300 mm, preferably between 50 mm and 200 mm, e.g. around 100 mm. The length of the strips 50 may advantageously be at least 100 mm and be up to the length of the blade, e.g. up to 100 m. In the future, even long strips may be used.

In addition, flow-promoting material 80, such as a fibre layer or fibre veil, may be arranged between precured fibrous strips 50 in order to promote resin flow during the infusion process. In the shown embodiment, the flow promoting material 80 is arranged in layers between layers of precured fibrous strips 50. However, flow-promoting material may also be arranged between neighbouring strips 50.

Further, the precured fibrous strips may be arranged between an inner skin layer 82 comprising one or more fibre layers, and an outer skin layer comprising one or more fibre layers, as shown in FIG. 4.

Figure 6:
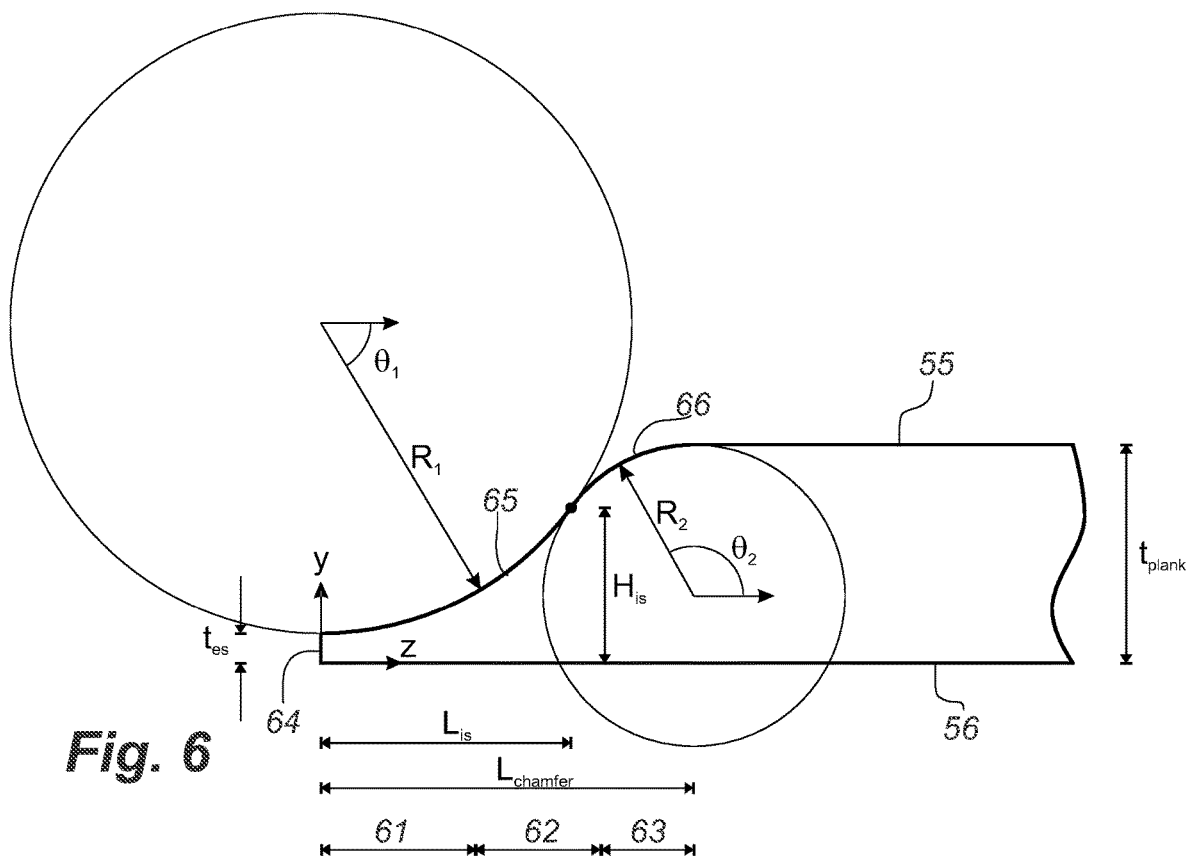
FIG. 6 shows a taper region of a precured fibrous strip.

FIG. 6 shows the taper region 60 of a precured fibrous strip 50 in more detail. As shown in the figure, the taper region tapers in thickness towards the first longitudinal end 51 and comprises a first taper section 61 proximal to the first longitudinal end and having a first average taper angle, a third taper section distal 63 to the first longitudinal end 51 and having a third average taper angle; and a second taper section 62 between the first taper section 61 and the third taper section 63 and having a second average taper angle. The second average taper angle is larger than both the first average taper angle and the third average taper angle. Accordingly, it is seen that the precured fibrous composite strip 50 comprises a section 61 with a shallow taper angle near the start of the taper region, a middle section 62 with a larger taper angle, and a section 63 with a shallow taper angle near the longitudinal end 51 of the strip 50. Thereby, a smooth transition is obtained in the longitudinal direction, which is particular advantageous, when stacking such strips on top of each other in a load-carrying structure or where a fibre material is arranged over the strips 50. The smooth transition lowers the formation of resin rich area and the formation of wrinkles in the fibre material that is draped over the strips 50.

Further, as shown in FIG. 6, the taper region 60 has a blunt face 64 at the first longitudinal end 51, wherein the blunt face 64 has an end step thickness $t_{es}$. By leaving the end face slightly blunt, the end of the precured fibrous strip 50 is even less likely to break off or form cracks. The end step thickness $t_{es}$ may be between 0.01 mm and 0.3 mm, preferably between 0.05 mm and 0.2 mm, e.g. around 0.1 mm.

In a preferred embodiment, the taper region 60 has a substantially S-shaped profile as seen in the longitudinal direction of the strip 50. In practice, this may be obtained by dividing the taper region 60 into a first curvature region 65 proximal to the first longitudinal end 51 and having an outer radius $R_1$ of curvature, wherein the first curvature region 65 has an intersection length $L_{is}$, and a second curvature region 66 distal to the first longitudinal end and having an inner radius $R_2$ of curvature. This provides a particular simple way of providing a substantially S-shaped profile.

The S-shaped profile can be described using a single variable. The model for the profile of the taper region 60 has been compared to precured fibrous strips with a straight taper section to demonstrate their potential in optimising an allowable crack length at the first longitudinal end 51.

The principle of the model is that a S-shaped profile can be described by two circles with different radii. The S-shaped profile is illustrated in FIG. 6. A coordinate system with the y-axis oriented in the thickness direction of the strip 50 and a z-axis oriented in the longitudinal direction is shown in the lower left corner.

The profile of the first curvature region 65 and the second curvature region 66 follows two circles as shown in FIG. 6. The centres of the two circles are fixed in the z-direction at $z=0$ and $z=L_{chamfer}$ respectively, while the y-coordinate is governed by the radii of the two circles, $R_1$ and $R_2$. The end step thickness is denoted $t_{es}$, and the thickness of the strip 50 is denoted $t_{plank}$. The intersection between the two circles has the global coordinate (y, z)=($H_{IS}$, $L_{IS}$), where subscript "IS" denoted the intersection. $H_{IS}$ may be determined from the following equation:

$$H_{IS} = \frac{L_{IS} t_{plank}}{L_{chamfer}}.$$

The S-shaped profile may be determined from the following system of equations:

$$R_1 \cos(\theta_1^{IS}) = L_{IS} \quad (1)$$

$$R_1(1-\sin(\theta_1^{IS})) = H_{IS} - t_{es} \quad (2)$$

$$R_2 \cos(\theta_2^{IS}) = L_{chamfer} - L_{IS} \quad (3)$$

$$t_{plank} - R_2(1-\sin(\theta_2^{IS})) = H_{IS} \quad (4)$$

The above equations may be split in to two sets of equations, (1 and 2) and (3 and 4), with two unknowns, ($R_1$ and $\theta_1$) and ($R_2$ and $\theta_2$) respectively.

The solutions to the four equations are:

$$R_1 = \frac{(H_{IS} - t_{es})^2 + L_{IS}{}^{\wedge}2}{2(H_{IS} - L_{IS})} \quad (5)$$

$$\theta_1^{IS} = \cos^{-1}\left(\frac{L_{IS}}{H_{IS}}\right) \quad (6)$$

$$R_2 = \frac{(t_{plank} - H_{IS})^2 + (L_{chamfer} - L_{IS})^2}{2(t_{plank} - H_{IS})^2} \quad (7)$$

$$\theta_2^{IS} = \cos^{-1}\left(\frac{L_{chamfer} - L_{IS}}{R_2}\right) \quad (8)$$

For a given chamfer length, $L_{chamfer}$, plank thickness, $t_{plank}$, and end step thickness, $t_{es}$, the chamfer profile may be described using a single variable, viz. the z-coordinate for the intersection length, $L_{IS}$. Typically, the thickness, $t_{plank}$ is fixed and the end step thickness, $t_{es}$, is predefined, leaving the single variable to be the non-dimensional parameter, $L_{IS}/L_{chamfer}$.

The S-shaped profile is described by the first curvature region 65 and the second curvature region as shown in the below table:

| z | y | Range |
|---|---|---|
| First curvature region 65: $0 \leq z \leq L_{IS}$ | | |
| $R_1 \cos(\theta_1)$ | $t_{es} - R_1(\sin(\theta_1) - 1)$ | $\theta_1 : \frac{\pi}{2} \to \theta_1^{IS}$ |
| Second curvature region 66: $L_{IS} \leq z \leq L_{chamfer}$ | | |
| $L_{chamfer} - R_2 \cos(\theta_2)$ | $t_{plank} - R_2(1 - \sin(\theta_2))$ | $\theta_2 : \theta_2^{IS} \to \frac{\pi}{2}$ |

In a preferred embodiment, the profile of the taper region 60 deviates at most 5%, preferably at most 3%, and more preferably at most 2% from the above model. In other words, the profile has a tolerance of at most 5%, at most 3%, or at most 2% of the defined profile.

Figure 7:
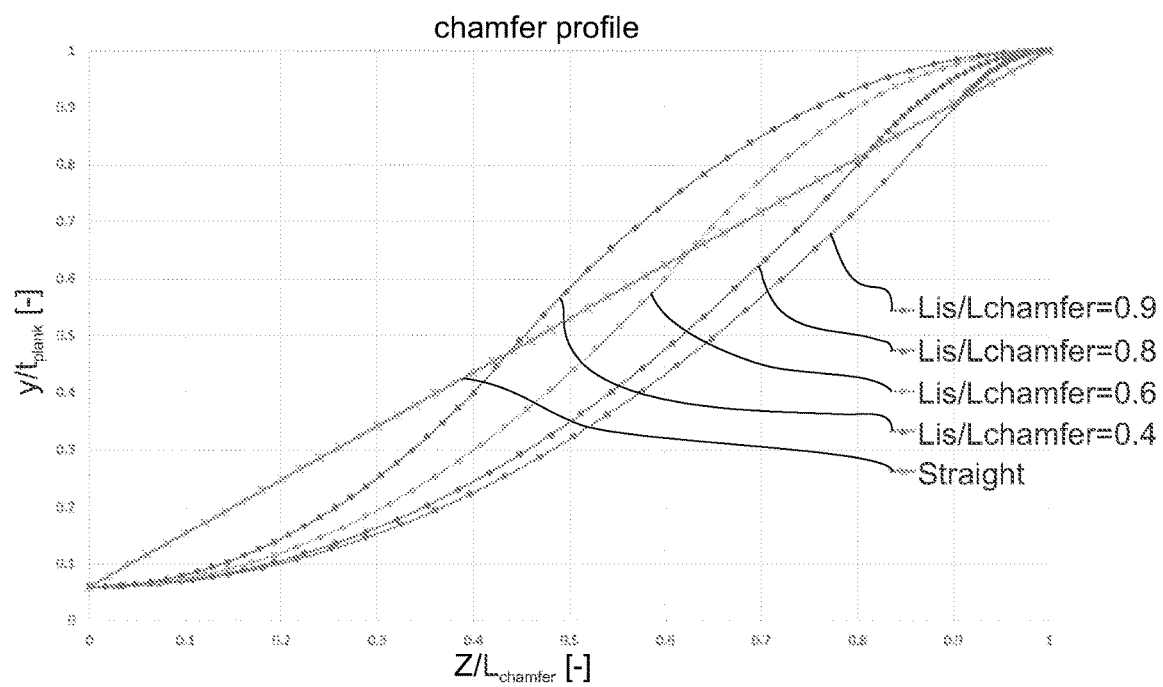
FIG. 7 shows various profiles for the taper region of a precured fibrous strip.

Examples of different profiles for the taper region 60 with different values of $L_{IS}/L_{chamfer}$ are presented in FIG. 7 and compared to a profile with a straight chamfer.

The different profiles have been compared to profiles with a straight chamfer using J. W. Hutchinson's model for evaluating an interface crack between two elastic layers to evaluate an Energy Release Rate (ERR) as described in the article "Interface crack between two elastic layers," published in International Journal of Fracture 43 in 1988. Applying Hutchinson's model to the problems of plank drop at the end of a strip and describing the height of the chamfered profile as a function of the crack length, the ERR may be calculated for different crack lengths along the interface between strips to determine a critical crack length. For a strip with an S-shaped taper region 60, the critical crack length is improved approximately with a factor of 6 compared to the critical crack length of a strip with a straight chamfer for $L_{IS}/L_{chamfer}=0.4$. For higher values of this ratio, the critical crack length is improved even further.

Figure 8:
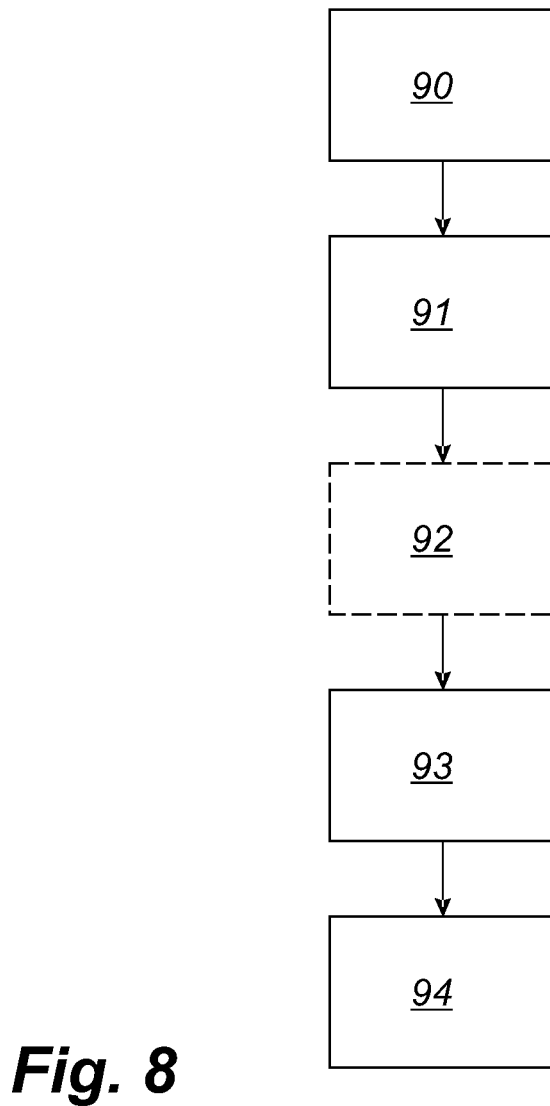
FIG. 8 shows steps in a manufacturing method.

In the following, a method of manufacturing a spar cap for a wind turbine blade according to the present disclosure is described. The method comprises the steps shown in FIG. 8.

In a first step 90, a plurality of precured fibrous strips including at least one precured fibrous strip 50 as described above is provided. In a second step 91, the plurality of precured fibrous strips are stacked such that interface regions are formed between adjacent precured fibrous strips. In an optional third step 93, flow-promoting material is arranged between at least some of the stacked precured fibrous strips. In a fourth step 94, resin is supplied to the plurality of precured fibrous strips and causing the resin to fill the interface regions between adjacent strips. In a fifth step 95, the resin is cured in order to form the spar cap.

The plurality of precured strips may be stacked in an array. Further, the manufacturing method may additionally comprise the step of draping a fibre layer over the plurality of stacked precured fibrous strips before the step of supplying resin.

LIST OF REFERENCE NUMERALS 2 wind turbine
4 tower
6 nacelle
8 hub
10 blade
14 blade tip
16 blade root
18 leading edge
20 trailing edge
22 pitch axis 30 root region
32 transition region
34 airfoil region
36 pressure side shell
38 suction side shell
39 shoulder
40 spar cap
50 precured fibrous strips/pultruded elements
51 first longitudinal end
52 second longitudinal end
53 first side
54 second side
55 upper surface
56 lower surface
60 taper region/first taper region
61 first taper section
62 second taper section
63 third taper section
64 blunt face
65 first curvature region
66 second curvature region
70 taper region/second taper region
80 flow promoting material
82 inner skin layer(s)
84 outer skin layer(s)
90-94 Method steps

The invention claimed is:

1. A precured fibrous composite strip for a load-carrying structure for a wind turbine blade, wherein the strips has:
a first longitudinal end and a second longitudinal end;
a first side and a second side with a width defined as a distance between the first side and the second side; and
an upper surface and a lower surface with a thickness defined as a distance between the upper surface and the lower surface,
wherein the strip comprises a taper region with a taper length at the first longitudinal end, wherein the strip in the taper region continuously tapers towards the first longitudinal end,
wherein the taper region tapers in thickness towards the first longitudinal end and comprises:
a first taper section proximal to the first longitudinal end and having a first average taper angle, the first average taper angle being an average of first tapering angles of the taper region, with respect to a longitudinal direction, within the first taper section;
a third taper section distal to the first longitudinal end and having a third average taper angle, the third average taper angle being an average of third tapering angles of the taper region, with respect to the longitudinal direction, within the third taper section;
a second taper section between the first taper section and the third taper section and having a second average taper angle, the second average taper angle being an average of second tapering angles of the taper region, with respect to the longitudinal direction, within the second taper section,
wherein the second average taper angle is larger than both the first average taper angle and the third average taper angle.

2. The precured fibrous strip according to claim 1, wherein the taper section has a blunt face at the first longitudinal end, wherein the blunt face has an end step thickness.

3. The precured fibrous strip according to claim 2, wherein the end step thickness is between 0.01 mm and 0.3 mm.

4. The precured fibrous strip according to claim 2, wherein
the thickness of the strip is defined as $t_{plank}$,
the taper length is defined as $L_{chamfer}$,
an outer radius of curvature is defined as $R_1$,
an inner radius of curvature is defined as $R_2$,
the end step thickness is defined as $t_{es}$,
the longitudinal direction is defined as z, and
a thickness direction is defined as y,
wherein a first curvature region approximately has a first profile defined by:

$$z = R_1 \cos(q_1) \text{ and } y = t_{es} - R_1(\sin(q_1)-1) \text{ for } q_1 = [p/2; q_1^{IS}]; \text{ and}$$

wherein a second curvature region approximately has a second profile defined by:

$$Z = L_{chamfer} - R_2 \cos(q_2) \text{ and } y = t_{plank} - R_2(1-\sin(q_2)) \text{ for } q_2 = [q_2^{IS}; p/2],$$

wherein
$q_1^{IS}$ is the value of variable $q_1$ at an intersection between the first curvature region and the second curvature region, and
$q_2^{IS}$ is the value of variable $q_2$ at the intersection between the first curvature region and the second curvature region.

5. The precured fibrous strip according to claim 4, wherein a profile of the taper section deviates at most 5%.

6. The precured fibrous strip according to claim 1, wherein the first taper section has a concave profile, the third taper section has a convex taper profile, and the second taper section has a concave taper profile transitioning into a convex taper profile.

7. The precured fibrous strip according to claim 6, wherein the taper region comprises:
a first curvature region proximal to the first longitudinal end and having an outer radius of curvature, wherein the first curvature region has an intersection length; and
a second curvature region distal to the first longitudinal end and having an inner radius of curvature.

8. The precured fibrous strip according to claim 1, wherein the taper region has a thickness to length ratio in the range 1:10 to 1:200.

9. The precured fibrous strip according to claim 1, wherein the strip is a pultruded element and comprises unidirectionally oriented reinforcement fibres oriented in the longitudinal direction.

10. The precured fibrous strip according to claim 1, wherein the thickness of the strip is between 1 mm and 10 mm.

11. The precured fibrous strip according to claim 1, wherein the width of the strip is between 30 mm and 300 mm.

12. The precured fibrous strip according to claim 1, wherein the length of the strips is between 100 mm and 100 m.

13. A spar cap for a wind turbine blade comprising the precured fibrous strip according to claim 1.

14. The spar cap of claim 13, wherein the spar cap comprises a plurality of stacked precured fibrous strips and comprising at least one precured fibrous strip according to claim 1.

15. A wind turbine blade comprising the spar cap according to claim 13.

16. A method of manufacturing a spar cap for a wind turbine blade, the method comprising:
providing a plurality of precured fibrous strips including at least one precured fibrous strip according to claim 1;

stacking the plurality of precured fibrous strips such that interface regions are formed between adjacent precured fibrous strips;

supplying resin to the plurality of precured fibrous strips and causing the resin to fill the interface regions between adjacent strips; and curing the resin in order to form the spar cap.

17. The method according to claim 16, wherein the plurality of precured strips are stacked in an array.

18. The method according to claim 17, wherein the method comprises the step of arranging flow-promoting material between at least some of the stacked precured fibrous strips.

19. The method according to claim 17, wherein the method comprises the step of draping a fibre layer over the plurality of stacked precured fibrous strips before the step of supplying resin.

20. A wind turbine blade spar cap manufactured according to claim 19.

* * * * *

UNITED STATES PATENT AND TRADEMARK OFFICE
CERTIFICATE OF CORRECTION

PATENT NO. : 12,466,144 B2
APPLICATION NO. : 18/026908
DATED : November 11, 2025
INVENTOR(S) : Jeppe Bjørn Jørgensen, Ole Nielsen and Rama Razeghi Page 1 of 1

It is certified that error appears in the above-identified patent and that said Letters Patent is hereby corrected as shown below:

In the Specification

In Column 9, Lines 52-53, please delete equation (7):

"$$R_2 = \frac{(t_{plank}-H_{IS})^2 + (L_{chamfer}-L_{IS})^2}{2(t_{plank}-H_{IS})^2} \quad (7)$$"

And replace with:

$$R_2 = \frac{(t_{plank}-H_{IS})^2 + (L_{chamfer}-L_{IS})^2}{2(t_{plank}-H_{IS})} \quad (7)$$

Signed and Sealed this
Twenty-third Day of December, 2025

John A. Squires
*Director of the United States Patent and Trademark Office*